(12) United States Patent
Schaffnit

(10) Patent No.: US 8,558,406 B2
(45) Date of Patent: Oct. 15, 2013

(54) LOW COST ELECTRIC POWER TAKE OUT FUNCTIONALITY FOR FUEL CELL HYBRID VEHICLES

(75) Inventor: Jochen Schaffnit, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 457 days.

(21) Appl. No.: 13/010,163

(22) Filed: Jan. 20, 2011

(65) Prior Publication Data

US 2012/0187753 A1   Jul. 26, 2012

(51) Int. Cl.
*B60L 1/00*        (2006.01)
(52) U.S. Cl.
USPC .......................................................... 307/9.1
(58) Field of Classification Search
USPC .......................................................... 307/9.1
See application file for complete search history.

(56) References Cited

U.S. PATENT DOCUMENTS

2010/0133900 A1* 6/2010 King ............................ 307/9.1

OTHER PUBLICATIONS

Jochen Schaffnit, U.S. Appl. No. 12/791,632, filed Jun. 1, 2010, entitled "Vehicular Electrical Systems".

* cited by examiner

*Primary Examiner* — Robert L. Deberadinis
(74) *Attorney, Agent, or Firm* — John A. Miller; Miller IP Group, PLC

(57) ABSTRACT

An electrical system for a fuel cell hybrid vehicle where the vehicle includes a fuel cell stack and a high voltage battery. A traditional bi-directional DC/DC power converter is provided in a high voltage bus that couples the fuel cell stack voltage and the battery voltage. Further, a traditional power inverter module is provided that converts the high voltage DC power signal on the high voltage bus to an AC signal suitable for an electric traction motor on the vehicle. The present invention proposes using the already existing bi-directional DC/DC power converter and the PIM as part of an electric power take out (EPTO) circuit that provides AC power for external vehicle loads while the fuel cell stack and battery are not being used to power the vehicle.

20 Claims, 2 Drawing Sheets

LOW COST ELECTRIC POWER TAKE OUT FUNCTIONALITY FOR FUEL CELL HYBRID VEHICLES

BACKGROUND OF THE INVENTION

1. Field of the Invention

This invention relates generally to an electrical architecture for a vehicle that includes an electric power take out (EPTO) circuit for providing AC power from the vehicle power sources to an external load and, more particularly, to an electrical architecture for a vehicle that includes an EPTO circuit for providing AC power from the vehicle power sources to an external load, where the EPTO circuit employs a bi-directional DC/DC power converter and a power inverter module (PIM) that are existing electrical devices on the vehicle for other purposes.

2. Discussion of the Related Art

Electric vehicles are becoming more and more prevalent. These vehicles include hybrid vehicles, such as the extended range electric vehicles (EREV), that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc.

Most fuel cell vehicles are hybrid vehicles of the type referred to above that employ a rechargeable supplemental high voltage power source in addition to the fuel cell stack, such as a DC battery or an ultracapacitor. The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor can provide regenerative braking that can also be used to recharge the battery through the DC bus line.

U.S. patent application Ser. No. 12/791,632 titled, Vehicular Electrical Systems, filed Jun. 1, 2010, assigned to the assignee of the present application and herein incorporated by reference, discloses an electrical system for a fuel cell vehicle that includes circuit components for providing AC electrical power to electrical loads external to the vehicle. The electrical system includes a bi-directional DC/DC power converter electrically coupled to the high power voltage bus on which high voltage is provided to the vehicle systems from a fuel cell stack and a high voltage battery, including the vehicle's electric traction system. The bi-directional DC/DC power converter provides a regulated DC voltage that remains substantially constant as the voltage on the high voltage bus fluctuates. The stable DC power from the bi-directional DC/DC power converter is provided to a separate power inverter module (PIM) that converts the DC power signal to an AC power signal. An AC receptacle is coupled to the PIM so that the external loads can be plugged into the receptacle to draw the AC power.

The vehicle electrical system described in the '632 application requires a supplemental bi-directional DC/DC power converter in addition to the existing bi-directional DC/DC power converter provided on the high voltage bus between the battery and the fuel cell stack. Also, the electrical system described in the '632 application requires a supplemental power inverter module to convert the DC power signal from the supplemental DC/DC power converter to an AC power signal in addition to the already existing PIM that converts the high voltage DC power signal to an AC signal suitable for the vehicle's electrical traction system. These components add cost, weight and complexity to the vehicle.

SUMMARY OF THE INVENTION

In accordance with the teachings of the present invention, an electrical system for a fuel cell hybrid vehicle is disclosed where the vehicle includes a fuel cell stack and a high voltage battery. A traditional bi-directional DC/DC power converter is provided in a high voltage bus that couples the fuel cell stack voltage and the battery voltage. Further, a traditional power inverter module is provided that converts the high voltage DC power signal on the high voltage bus to an AC signal suitable for an electric traction motor on the vehicle. The present invention proposes using the already existing bi-directional DC/DC power converter and the PIM as part of an electric power take out (EPTO) circuit that provides AC power for external vehicle loads while the fuel cell stack and battery are not being used to power the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an electrical system for a fuel cell vehicle is merely exemplary in nature, and is in no way intended to limit the invention or its applications or uses. For example, the electrical system discussed herein has particular application for a fuel cell vehicle. However, as well be appreciated by those skilled in the art, the electrical system may have application for other hybrid vehicles.

Figure 1:
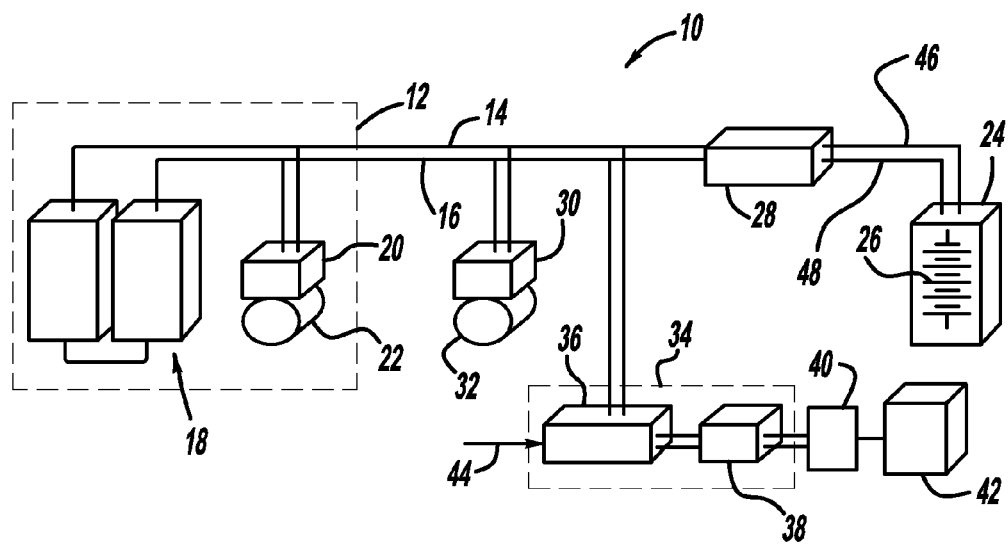
FIG. 1 is a schematic block diagram of an electrical system for a fuel cell vehicle that includes an electric power take out circuit.

FIG. 1 is a schematic block diagram of an electrical system 10 for a fuel cell hybrid vehicle. The system 10 includes a fuel cell power module 12 electrically coupled to positive and negative high voltage bus lines 14 and 16. The fuel cell power module 12 includes a split fuel cell stack 18 and a PIM 20 electrically coupled to the bus lines 14 and 16. The PIM 20 converts the DC voltage on the bus lines 14 and 16 to an AC voltage suitable for the motor of an air compressor 22 that provides air to the cathode side of the stack 18. A high voltage battery 24 is electrically coupled to high voltage bus lines 46 and 48, where the battery 24 includes battery cells 26 electrically coupled in series. A bi-directional DC/DC power converter (BDC) 28 is electrically coupled between the bus lines 14 and 16 and the bus lines 46 and 48 and provides voltage matching for the voltage from the fuel cell stack 18 and the high voltage battery 24 in a manner that is well understood by those skilled in the art.

The electrical system 10 also includes an electric traction system (ETS) power inverter module (PIM) 30 electrically coupled to the bus lines 14 and 16 and an AC traction motor 32 that is part of an ETS that drives the vehicle. The PIM 30 converts the DC voltage on the bus lines 14 and 16 to an AC voltage suitable for the traction motor 32. The traction motor 32 provides the traction power to operate the vehicle. During regenerative braking, rotational energy from the vehicle wheels (not shown) causes the traction motor 32 to operate as a generator that provides electrical current to the bus lines 14 and 16, which can be used by the BDC 28 to charge the battery 24 on the bus lines 46 and 48 in a manner that is well understood by those skilled in the art.

The electrical system 10 also includes an EPTO circuit 34 electrically coupled to the high voltage bus lines 14 and 16. An EPTO circuit of this type is discussed in more detail in the '632 application referred to above. The EPTO circuit 34 includes a bi-directional DC/DC power converter 36 that receives the high voltage power signal from the bus lines 14 and 16 and provides power regulation to provide a stable EPTO output voltage that can be converted to a desired AC electrical power signal, for example, 110 volts AC. The bi-directional DC/DC power converter 36 provides a constant voltage and also reduces the high voltage on the bus lines 14 and 16 to the desired voltage level, typically 110 volts DC. The voltage signal from the bi-directional DC/DC power converter 36 is provided to an ETS PIM 38 that provides the DC to AC conversion in a manner that is well understood by those skilled in the art. The PIM 38 would typically include a series of electrically coupled switches and diodes to provide the conversion, such as described in the '632 application and well understood by those skilled in the art. The AC output from the EPTO circuit 34 is provided to an AC receptacle 40 to which external loads 42, such as a compressor, lights, etc., can be plugged into to be powered. A power limit signal for the bi-directional DC/DC power converter 36 provided on line 44 is used to control the amount of power that can be drawn from the EPTO circuit 34 so that an electrical device that draws more power than the fuel cell stack 18 can provide is prevented from drawing that much power from the bus lines 14 and 16. The '632 application provides further discussion of the control strategy for the EPTO circuit 34. The system 10 would operate in an EPTO mode when it was providing power to the load 42, which would prevent the vehicle from travelling.

The power provided to the bus lines 14 and 16 by both the fuel cell stack 18 and the battery 24 when the particular load 42 is plugged into the receptacle 40 allows high or fast transient power demands to be met by the battery power, and after the fuel cell stack 18 has ramped up to the desired power level, the power for the load 42 is provided by the fuel cell stack 18.

In the electrical configuration shown in the system 10, the power provided to the EPTO circuit 34 from the high voltage bus lines 14 and 16 only goes through a single bi-directional DC/DC power converter, i.e., the converter 36, before being applied to the load 42. However, there may be a short delay in the power ramp up provided by the fuel cell stack 18 if a high voltage load was demanded immediately. This can be overcome by electrically coupling the EPTO circuit 34 to the high voltage bus lines 46 and 48 between the bi-directional DC/DC converter 28 and the battery 24. However, this electrical architecture has the disadvantage that the fuel cell stack power would then need to go through two bi-directional DC/DC converters, namely the converters 28 and 36, and thus would suffer the electrical losses associated with those components.

Figure 2:
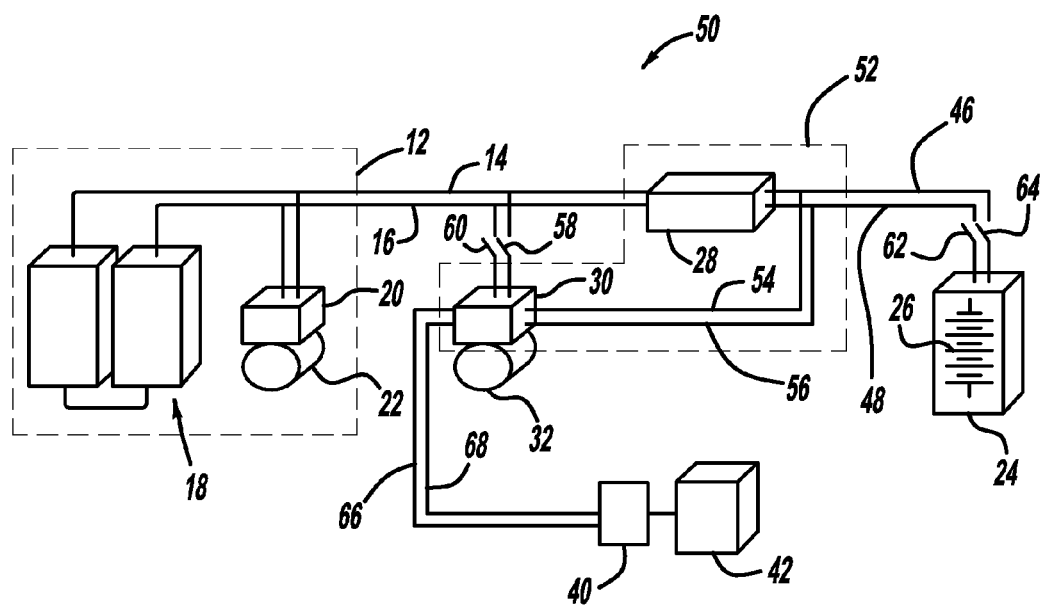
FIG. 2 is a schematic block diagram of an electrical system for a fuel cell vehicle that includes an electric power take out circuit that employs an existing power inverter module and bi-directional DC/DC power converter.

FIG. 2 is a schematic block diagram of an electrical system 50 for a fuel cell hybrid vehicle similar to the electrical system 10, where like elements are identified by the same reference number. As discussed above, the EPTO circuit 34 includes the bi-directional DC/DC power converter 36 and the ETS PIM 38. The present invention recognizes that components of this type already exist in the electrical system without the EPTO circuit 34, namely the bi-directional DC/DC power converter 28 and the ETS PIM 30. Therefore, the present invention proposes an EPTO circuit 52 that employs the bi-directional DC/DC power converter 28 and the ETS PIM 30 that would operate in their normal manner when the fuel cell vehicle is being operated, and operate as part of the EPTO circuit 52 when the fuel cell vehicle is not traveling. The EPTO circuit 52 includes lines 54 and 56 that electrically couple the ETS PIM 30 to the high voltage bus lines 46 and 48, respectively, between the bi-directional DC/DC power converter 28 and the battery 24 so that the voltage provided to the EPTO circuit 52 from the fuel cell stack 18 goes through the bi-directional DC/DC power converter 28. The bi-directional DC/DC power converter 36 and the ETS PIM 38 are the main components in the EPTO circuit 34 discussed above, and provided most of the weight and cost associated with the EPTO circuit 34. By using the existing bi-directional DC/DC power converter 28 and the ETS PIM 30 in the EPTO circuit 52, the weight, cost and complexity associated with providing an additional power converter and PIM as in the system 10 is removed.

The system 50 would provide a number of safety features that prevented the vehicle from being driven when the system 50 was in the EPTO mode and the load 42 was electrically coupled thereto. For example, contactors 58 and 60 are provided to disconnect the PIM 30 from the bus lines 14 and 16 when the vehicle is not traveling and the EPTO circuit 52 is being used. Further, battery contactors 62 and 64, already existing on the vehicle, would be opened to disconnect the battery 24 from the bus lines 46 and 48 so that fluctuations in battery voltage are not transferred to the stable EPTO voltage provided by the bi-directional DC/DC converter 28 on the lines 54 and 56 when the system 50 is in the EPTO mode. The stable AC voltage signal is provide to the receptacle 40 on lines 66 and 68. Although not specifically shown, the existing bi-directional DC/DC power converter 28 would include a control line similar to the control line 44 that limited the output power that was able to be provided to the PIM 30 when the system 50 was in the EPTO mode so that the EPTO output voltage is reduced.

In the electrical configuration of the system 50, the battery 24 is not available to provide power for the external load 42 because the contactors 62 and 64 are open. Although the EPTO circuit 52 would not be able to use battery power to respond to fast power transients, it has been shown that the output power from the fuel cell module 12 comes up to the desired power level very quickly, and possibly seamlessly, and thus is able to satisfactorily meet the fast power transients.

The EPTO circuit 52 in the electrical system 50 offers a number of advantages over the EPTO circuit 34 in the electrical system 10 because it uses the existing bi-directional DC/DC power converter 28 and ETS PIM 30 for the EPTO circuit 52. These advantages include lower system cost because of the double use of the already existing components, lower number of parts and less packaging volume, lower system mass, and therefore, better efficiency in normal driving, and lower system complexity.

Figure 3:
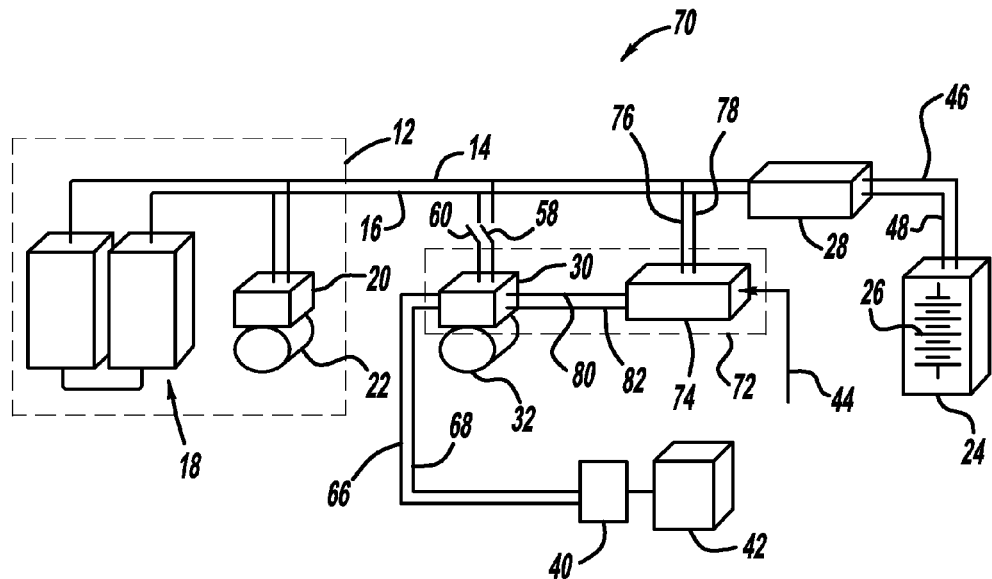
FIG. 3 is a schematic block diagram of an electrical system for a fuel cell vehicle that includes an electric power take out circuit that employs an existing power inverter module and a supplemental bi-directional DC/DC power converter electrically coupled to a high voltage bus between an existing bi-directional DC/DC power converter and a fuel cell stack.

If it is desirable to use battery power for the EPTO mode to better meet fast power transients, the EPTO circuit can still benefit by the use of existing components. FIG. 3 is a schematic block diagram of an electrical system 70 similar to the electrical system 50, where like elements are identified by the same reference numeral. The electrical system 70 includes an EPTO circuit 72 employing a supplemental bi-directional DC/DC power converter 74 coupled to the bus lines 14 and 16 by lines 76 and 78, respectively instead of the bus lines 46 and 48. In this embodiment, the battery contactors 62 and 64 will be closed when the system 70 is in the EPTO mode so that it can benefit from the battery power response to fast transients. However, the EPTO circuit 72 still employs the existing ETS PIM 30, as discussed above, where the PIM 30 is disconnected from the bus lines 14 and 16 by the switches 58 and 60 when it is in the EPTO mode. The bi-directional DC/DC power converter 74 is electrically coupled to the PIM 30 by lines 80 and 82.

Figure 4:
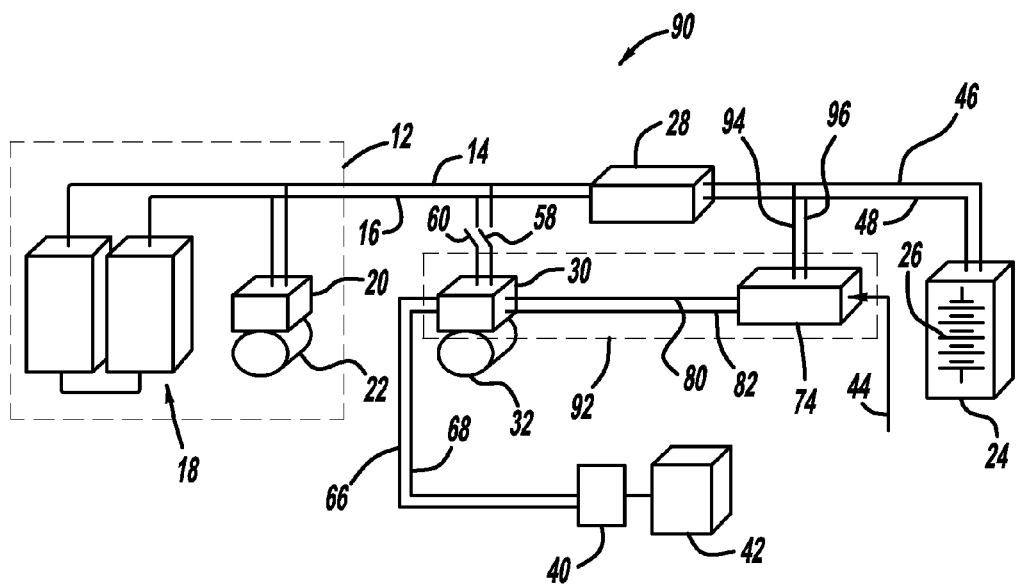
FIG. 4 is a schematic block diagram of an electrical system for a fuel cell vehicle that includes an electric power take out circuit that employs an existing power inverter module and a supplemental bi-directional DC/DC power converter electrically coupled to a high voltage bus line between an existing bi-directional DC/DC power converter and a high voltage battery.

In an alternate design, it may be desirable to electrically couple the bi-directional DC/DC power converter 74 to the bus lines 46 and 48 between the bi-directional DC/DC power converter 28 and the battery 24 for the reasons discussed above. FIG. 4 shows a schematic block diagram of an electrical system 90 depicting this embodiment, where like elements to the electrical system 70 are identified by the same reference numeral. In this embodiment, an EPTO circuit 92 includes the bi-directional DC/DC power converter 74 and the ETS PIM 30, but the power converter 74 is electrically coupled to bus lines 46 and 48 by lines 94 and 96, respectively, between the bi-directional DC/DC power converter 28 and the battery 24, as shown.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An electrical system for a fuel cell hybrid vehicle, said system comprising:
    a high voltage bus;
    a fuel cell stack electrically coupled to the high voltage bus;
    a high voltage battery electrically coupled to the high voltage bus;
    a bi-directional DC/DC power converter electrically coupled to the high voltage bus between the fuel cell stack and the high voltage battery;
    an electric traction system power inverter module electrically coupled to the high voltage bus, said power inverter module converting high voltage DC power signals from the high voltage bus to system AC power signals; and
    an electric power take out circuit including the bi-directional DC/DC power converter and the electric traction system power inverter module, said bi-directional power converter providing an external voltage signal and said power inverter module providing an external AC power signal when the electrical system is in an electric power take out mode.

2. The system according to claim 1 further comprising at least one contactor for disconnecting the power inverter module from the high voltage bus when the system is in the electric power take out mode.

3. The system according to claim 1 wherein the power inverter module is electrically coupled to the high voltage bus between the bi-directional DC/DC power converter and the fuel cell stack.

4. The system according to claim 1 further comprising an electric traction motor electrically coupled to the power inverter module and receiving the system AC signals.

5. The system according to claim 1 further comprising an AC receptacle electrically coupled to the power inverter module and receiving the external AC power signal.

6. The system according to claim 1 wherein the electric power take out circuit provides about 110 volts AC as the external AC power signal.

7. An electrical system for a fuel cell hybrid vehicle, said system comprising:
    a high voltage bus;
    a fuel cell stack electrically coupled to the high voltage bus;
    a high voltage battery electrically coupled to the high voltage bus;
    a first bi-directional DC/DC power converter electrically coupled to the high voltage bus between the fuel cell stack and the high voltage battery;
    an electric traction system power inverter module electrically coupled to the high voltage bus, said power inverter module converting high voltage DC power signals from the high voltage bus to system AC power signals; and
    an electric power take out circuit including a second bi-directional DC/DC power converter and the electric traction system power inverter module, said second bi-directional power converter being electrically coupled to the high voltage bus line and the power inverter module, said second bi-directional power converter providing an external voltage signal and said power inverter module providing an external AC power signal when the electrical system is in an electric power take out mode.

8. The system according to claim 7 further comprising an AC receptacle electrically coupled to the power inverter module and receiving the external AC power signal.

9. The system according to claim 7 further comprising an electric traction motor electrically coupled to the power inverter module and receiving the system AC signals.

10. The system according to claim 7 wherein the second bi-directional is coupled to the high voltage bus between the first bi-directional DC/DC power converter and the high voltage battery.

11. The system according to claim 7 wherein the second bi-directional is coupled to the high voltage bus between the first bi-directional DC/DC power converter and the fuel cell stack.

12. The system according to claim 7 further comprising at least one contactor for disconnecting the power inverter module from the high voltage bus when the system is in the electric power take out mode.

13. The system according to claim 7 wherein the power inverter module is electrically coupled to the high voltage bus between the bi-directional DC/DC power converter and the fuel cell stack.

14. The system according to claim 7 wherein the electric power take out circuit provides about 110 volts AC as the external AC power signal.

15. An electrical system for a hybrid vehicle, said system comprising:
   a high voltage bus;
   a power source electrically coupled to the high voltage bus;
   a high voltage battery electrically coupled to the high voltage bus;
   a bi-directional DC/DC power converter electrically coupled to the high voltage bus between the power source and the high voltage battery;
   an electric traction system power inverter module electrically coupled to the high voltage bus power inverter module between the bi-directional DC/DC power converter and the power source, said power inverter module converting high voltage DC power signals from the high voltage bus to system AC power signals; and
   an electric power take out circuit including the bi-directional DC/DC power converter and the electric traction system power inverter module, said bi-directional power converter providing an external voltage signal and said power inverter module providing an external AC power signal when the electrical system is in an electric power take out mode.

16. The system according to claim 15 further comprising at least one contactor for disconnecting the power inverter module from the high voltage bus when the system is in the electric power take out mode.

17. The system according to claim 15 wherein the power source is a fuel cell stack.

18. The system according to claim 15 further comprising an electric traction motor electrically coupled to the power inverter module and receiving the system AC signals.

19. The system according to claim 15 further comprising an AC receptacle electrically coupled to the power inverter module and receiving the external AC power signal.

20. The system according to claim 15 wherein the electric power take out circuit provides about 110 volts AC as the external AC power signal.

* * * * *